United States Patent
Narioka et al.

(10) Patent No.: US 12,468,867 B2
(45) Date of Patent: Nov. 11, 2025

(54) SIMULATION METHOD, SIMULATION APPARATUS, COMPUTER READABLE MEDIUM, FILM FORMING APPARATUS, AND METHOD OF MANUFACTURING ARTICLE

(71) Applicant: CANON KABUSHIKI KAISHA, Tokyo (JP)

(72) Inventors: Shintaro Narioka, Tochigi (JP); Yuichiro Oguchi, Tokyo (JP); Sentaro Aihara, Tochigi (JP); Ken Katsuta, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 983 days.

(21) Appl. No.: 17/372,622

(22) Filed: Jul. 12, 2021

(65) Prior Publication Data

US 2022/0027533 A1    Jan. 27, 2022

(30) Foreign Application Priority Data

Jul. 21, 2020   (JP) .................................. 2020-124644

(51) Int. Cl.
*G06F 30/20* (2020.01)
*G06T 11/40* (2006.01)

(52) U.S. Cl.
CPC .............. *G06F 30/20* (2020.01); *G06T 11/40* (2013.01); *G06T 2200/24* (2013.01)

(58) Field of Classification Search
CPC .......... G06F 30/20; G06F 30/25; G06F 30/28; G06F 2113/22; G06T 11/40; G06T 2200/24; G16C 60/00; G03F 7/0002; G03F 7/705; G03F 7/7035; G03F 7/70525; G03F 7/70508; G03F 7/706835

(Continued)

(56) References Cited

U.S. PATENT DOCUMENTS

| 9,201,990 | B2 | 12/2015 | Wakamatsu | |
| 2005/0270312 | A1* | 12/2005 | Lad | B82Y 10/00 347/1 |

FOREIGN PATENT DOCUMENTS

| JP | 2012019222 A | 1/2012 |
| JP | 2014103189 A | 6/2014 |

(Continued)

OTHER PUBLICATIONS

Liang et al., Air bubble formation and dissolution in dispensing nanoimprint lithography, 2007, Nanotechnology 18 025303, 7 pages.*

(Continued)

*Primary Examiner* — Juan C Ochoa
(74) *Attorney, Agent, or Firm* — ROSSI, KIMMS & McDOWELL LLP

(57) ABSTRACT

A simulation method is performed for simulating a behavior of a curable composition in a film forming apparatus that brings the curable composition arranged on a first member and a second member into contact with each other, and forms a film of the curable composition on the first member. The method includes obtaining a difference between a nominal value for simulating the behavior and an actual value corresponding to the nominal value in the film forming apparatus, and simulating the behavior using, as input information, the actual value obtained from the nominal value and the difference.

20 Claims, 15 Drawing Sheets

(58) Field of Classification Search
USPC .......................................................... 703/2, 6
See application file for complete search history.

(56) References Cited

FOREIGN PATENT DOCUMENTS

| | | |
|---|---|---|
| JP | 5599356 B2 | 10/2014 |
| JP | 2017162875 A | 9/2017 |
| JP | 2017215778 A | 12/2017 |

OTHER PUBLICATIONS

Xing et al., "Simulation of droplet formation and coalescence using lattice Boltzmann-based single-phase model", 2007, Journal of Colloid and Interface Science 311.2, pp. 609-618.*

* cited by examiner

FIG. 2

201 — NOMINAL VALUE

| No. | X COORDINATE | Y COORDINATE | VOLUME |
|---|---|---|---|
| 1 | 0.0 | 0.0 | 1.0 |
| 2 | 2.0 | 0.0 | 1.0 |
| 3 | 4.0 | 0.0 | 1.0 |
| 4 | 0.0 | 2.0 | 1.0 |
| ... | | | |

202 — IMP #1: DIFFERENCE FOR NOMINAL VALUE

| No. | X COORDINATE | Y COORDINATE |
|---|---|---|
| 1 | -0.1 | 0.0 |
| 2 | -0.1 | 0.0 |
| 3 | -0.1 | 0.0 |
| 4 | -0.1 | 2.0 |
| ... | | |

203 — IMP #2: DIFFERENCE FOR NOMINAL VALUE

| No. | X COORDINATE | Y COORDINATE |
|---|---|---|
| 1 | 0.0 | -0.1 |
| 2 | 0.0 | -0.1 |
| 3 | 0.0 | -0.1 |
| 4 | 0.0 | -0.1 |
| ... | | |

204 — IMP #3: DIFFERENCE FOR NOMINAL VALUE

| No. | X COORDINATE | Y COORDINATE |
|---|---|---|
| 1 | 0.1 | 0.0 |
| 2 | 0.1 | 0.0 |
| 3 | 0.1 | 0.0 |
| 4 | 0.1 | 0.0 |
| ... | | |

205 — ACTUAL VALUE #1

| No. | X COORDINATE | Y COORDINATE | VOLUME |
|---|---|---|---|
| 1 | -0.1 | 0.0 | 1.0 |
| 2 | 1.9 | 0.0 | 1.0 |
| 3 | 3.9 | 0.0 | 1.0 |
| 4 | -0.1 | 2.0 | 1.0 |
| ... | | | |

206 — ACTUAL VALUE #2

| No. | X COORDINATE | Y COORDINATE | VOLUME |
|---|---|---|---|
| 1 | 0.0 | -0.1 | 1.0 |
| 2 | 2.0 | -0.1 | 1.0 |
| 3 | 4.0 | -0.1 | 1.0 |
| 4 | 0.0 | -2.1 | 1.0 |
| ... | | | |

207 — ACTUAL VALUE #3

| No. | X COORDINATE | Y COORDINATE | VOLUME |
|---|---|---|---|
| 1 | 0.1 | 0.0 | 1.0 |
| 2 | 2.1 | 0.0 | 1.0 |
| 3 | 4.1 | 0.0 | 1.0 |
| 4 | 0.1 | 2.0 | 1.0 |
| ... | | | |

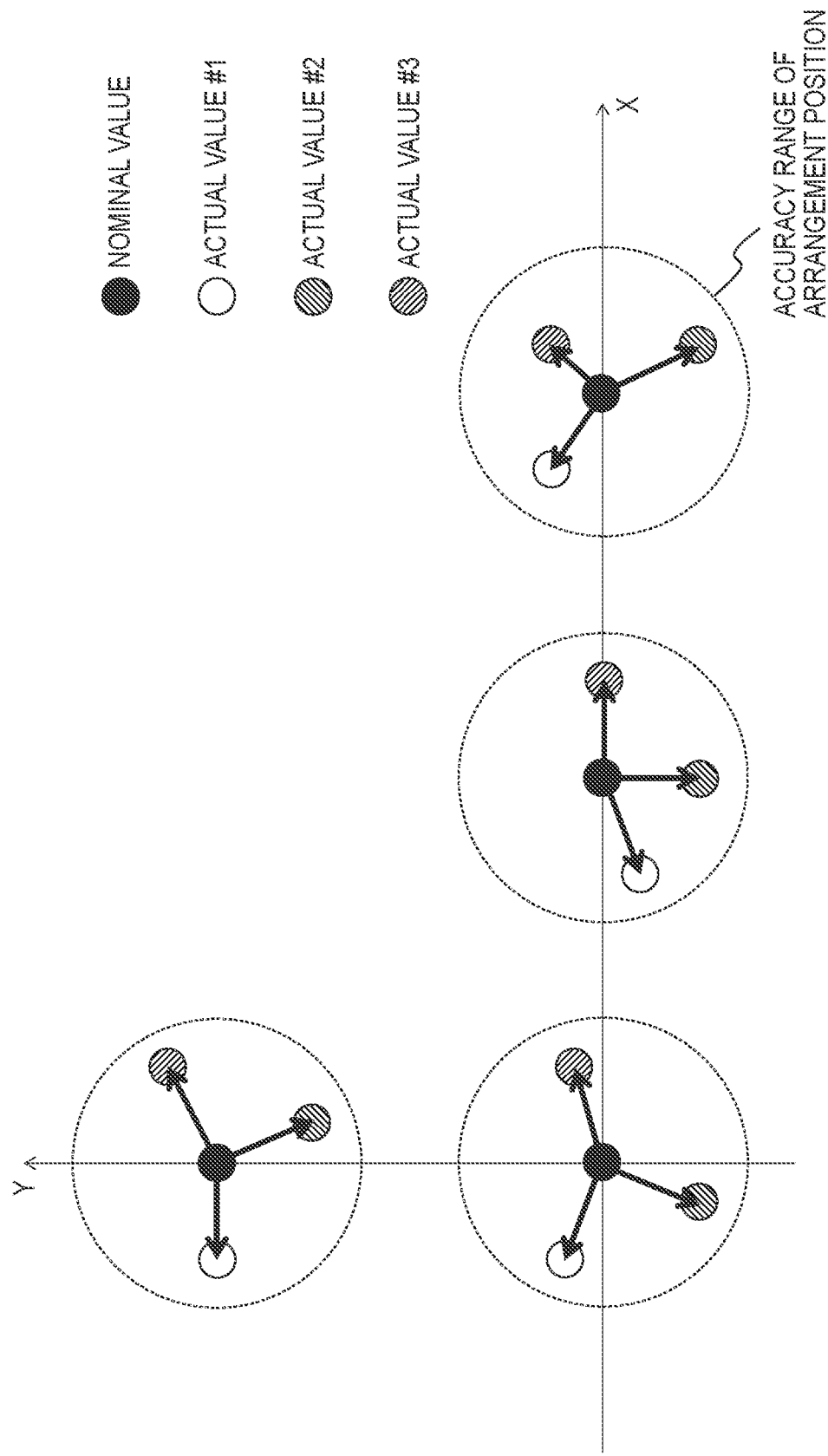

SIMULATION METHOD, SIMULATION APPARATUS, COMPUTER READABLE MEDIUM, FILM FORMING APPARATUS, AND METHOD OF MANUFACTURING ARTICLE

BACKGROUND OF THE INVENTION

Field of the Invention

The present invention relates to a simulation method, a simulation apparatus, a computer readable medium, a film forming apparatus, and a method of manufacturing an article.

Description of the Related Art

There is provided a film forming method of forming a film made of a cured product of a curable composition on a substrate by arranging the curable composition on the substrate, bringing the curable composition and a mold into contact with each other, and curing the curable composition. Such film forming method can be applied to an imprint method, a planarization method, and the like. In the imprint method, by using a mold having a pattern, the pattern of the mold is transferred to a curable composition on a substrate. In the planarization method, by using a mold having a flat surface, a film having a flat upper surface is formed by bringing a curable composition on a substrate and the flat surface into contact with each other and curing the curable composition.

The curable composition can be arranged in the form of droplets or a film on the substrate. After that, the mold can be brought into contact with the curable composition on the substrate. This fills a region between the mold and the substrate with the curable composition. In this process, for example, it is important to form a film of the curable composition with a uniform thickness and to include no bubble in the film. To achieve this, the method of bringing the mold into contact with the curable composition, the condition, and the like can be adjusted. To implement this adjustment operation by trial and error including film formation using a film forming apparatus, enormous time and cost are required. To cope with this, it is desired that a simulator for supporting such adjustment operation appears.

Japanese Patent No. 5599356 describes a simulation method of predicting wet-spreading and coalescence of a plurality of droplets using gas-liquid two-phase flow analysis.

When attempting to simulate the behavior of a curable composition in a film forming apparatus, a nominal value (design reference value) in design of the film forming apparatus can be used as a simulation condition. However, an actual film forming apparatus operates under a condition that there is a difference within an accuracy range with respect to the nominal value in design of the apparatus. This difference may cause a difference between the actual behavior of the curable composition and the behavior of the curable composition obtained by a simulation. Therefore, if process adjustment is made progress by a simulation using the nominal value, the adjustment result may be inappropriate for the actual film forming apparatus. In this case, it may become necessary to repeat process adjustment in the actual film forming apparatus based on the adjustment result obtained by a simulation.

SUMMARY OF THE INVENTION

The present invention provides a technique advantageous in obtaining a simulation result on which an actual value is reflected.

A first aspect of the present invention provides a simulation method of simulating a behavior of a curable composition in a film forming apparatus that brings the curable composition arranged on a first member and a second member into contact with each other, and forms a film of the curable composition on the first member, the method comprising: obtaining a difference between a nominal value for simulating the behavior and an actual value corresponding to the nominal value in the film forming apparatus; and simulating the behavior using, as input information, the actual value obtained from the nominal value and the difference.

Further features of the present invention will become apparent from the following description of exemplary embodiments with reference to the attached drawings.

BRIEF DESCRIPTION OF THE DRAWINGS

FIG. 2 is a view exemplifying the relationships between nominal values and actual values;

FIG. 3 is a view exemplifying the relationships between the nominal values and the actual values;

DESCRIPTION OF THE EMBODIMENTS

Figure 1:
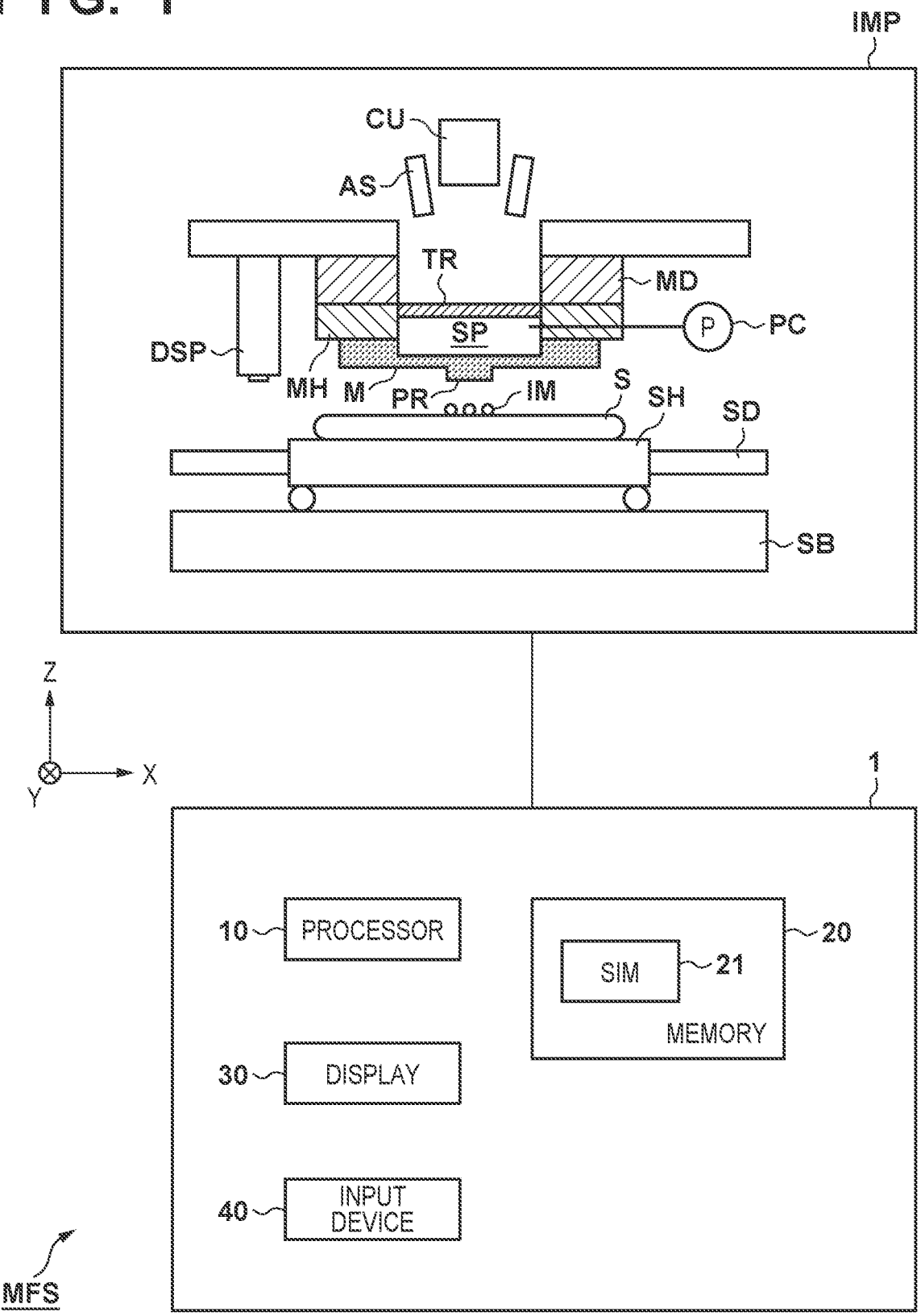
FIG. 1 is a view showing the arrangements of a film forming apparatus and a simulation apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 shows the arrangement of a film forming system MFS according to an embodiment. The film forming system MFS can include a film forming apparatus IMP and a simulation apparatus 1. The film forming apparatus IMP executes a process of bringing a plurality of droplets of a curable composition IM arranged on a substrate S and a mold M into contact with each other and forming a film of the curable composition IM in a space between the substrate S and the mold M. The film forming apparatus IMP may be formed as, for example, an imprint apparatus or a planarization apparatus. The substrate S and the mold M are interchangeable, and a film of the curable composition IM may be formed in the space between the mold M and the substrate S by bringing a plurality of droplets of the curable composition IM arranged on the mold M and the substrate S into contact with each other. Therefore, the film forming apparatus IMP is comprehensively an apparatus that executes a process of bringing a plurality of droplets of the curable composition IM arranged on the first member and the second member into contact with each other and forming a film of the curable composition IM in a space between the first member and the second member. An example in which the first member serves as the substrate S and the second member serves as the mold M will be described below. However, the first member may serve as the mold M and the second member may serve as the substrate S. In this case, the substrate S and the mold M in the following description are interchanged.

The imprint apparatus can use the mold M having a pattern to transfer the pattern of the mold M to the curable composition IM on the substrate S. The imprint apparatus can use the mold M having a pattern region PR provided with a pattern. The imprint apparatus can bring the curable composition IM on the substrate S and the pattern region PR of the mold M into contact with each other, fill, with the curable composition, a space between the mold M and a region where the pattern of the substrate S is to be formed, and then cure the curable composition IM. This transfers the pattern of the pattern region PR of the mold M to the curable composition IM on the substrate S. For example, the imprint apparatus can form a pattern made of a cured product of the curable composition IM on each of a plurality of shot regions of the substrate S.

Using the mold M having a flat surface, the planarization apparatus can bring the curable composition IM on the substrate S and the flat surface into contact with each other, and cure the curable composition IM, thereby forming a film having a flat upper surface. The planarization apparatus can form a film made of a cured product of the curable composition IM on the entire region of the substrate S by normally using the mold M having a size that can cover the entire region of the substrate S.

As the curable composition, a material to be cured by receiving curing energy can be used. As the curing energy, an electromagnetic wave, heat, or the like can be used. The electromagnetic wave can include, for example, light selected from the wavelength range of 10 nm (inclusive) to 1 mm (inclusive) and, more specifically, infrared light, a visible light beam, or ultraviolet light. The curable composition can be a composition cured by light irradiation or heating. A photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition can be, for example, 1 mPa·s (inclusive) to 100 mPa·s (inclusive). As the material of the substrate, for example, glass, a ceramic, a metal, a semiconductor, a resin, or the like can be used. A member made of a material different from the substrate may be provided on the surface of the substrate, as needed. The substrate includes, for example, a silicon wafer, a compound semiconductor wafer, or silica glass.

In the specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information that can be specified based on coordinates on the X-, Y-, and Z-axes, and an orientation is information that can be specified by values on the θX-, θY-, and θZ-axes. Positioning means controlling the position and/or orientation.

The film forming apparatus IMP can include a substrate holder SH that holds the substrate S, a substrate driving mechanism SD that drives the substrate S by driving the substrate holder SH, and a support base SB that supports the substrate driving mechanism SD. In addition, the film forming apparatus IMP can include a mold holder MH that holds the mold M and a mold driving mechanism MD that drives the mold M by driving the mold holder MH. The substrate driving mechanism SD and the mold driving mechanism MD can form a relative driving mechanism that drives at least one of the substrate S and the mold M so as to adjust the relative position between the substrate S and the mold M. Adjustment of the relative position by the relative driving mechanism can include driving to bring the curable composition IM on the substrate S and the mold M into contact with each other and driving to separate the mold M from the cured curable composition IM. In addition, adjustment of the relative position by the relative driving mechanism can include positioning between the substrate S and the mold M. The substrate driving mechanism SD can be configured to drive the substrate S with respect to a plurality of axes (for example, three axes including the X-axis, Y-axis, and θZ-axis, and preferably six axes including the X-axis, Y-axis, Z-axis, θX-axis, θY-axis, and θZ-axis). The mold driving mechanism MD can be configured to drive the mold M with respect to a plurality of axes (for example, three axes including the Z-axis, θX-axis, and θY-axis, and preferably six axes including the X-axis, Y-axis, Z-axis, θX-axis, θY-axis, and θZ-axis).

The film forming apparatus IMP can include a curing device CU for curing the curable composition IM with which the space between the substrate S and the mold M is filled. For example, the curing device CU can irradiate the curable composition IM with the curing energy via the mold M, thereby curing the curable composition IM. The mold M includes the first surface having the pattern region PR and a second surface on the opposite side of the first surface. The film forming apparatus IMP can include a transmissive member TR for forming a space SP on the second surface side (the opposite side of a surface opposing the substrate S) of the mold M. The transmissive member TR is made of a material that transmits the curing energy from the curing device CU, thereby making it possible to irradiate the curable composition IM with the curing energy. The film forming apparatus IMP can include a pressure controller PC that controls deformation of the mold M in the Z-axis direction by controlling the pressure of the space SP. For example, when the pressure controller PC makes the pressure of the space SP higher than the atmospheric pressure, the mold M can be deformed in a convex shape toward the substrate S.

The film forming apparatus IMP can include a dispenser DSP for arranging, supplying, or dispensing the curable composition IM on the substrate S. The substrate S on which the curable composition IM is arranged may be supplied to the film forming apparatus IMP by another apparatus. In this case, the film forming apparatus IMP need not include the dispenser DSP. The film forming apparatus IMP may include an alignment scope AS for measuring an alignment error between the substrate S (or the shot region of the substrate S) and the mold M.

The simulation apparatus 1 can simulate the behavior of the curable composition IM in a process executed by the film forming apparatus IMP. The simulation of the behavior of the curable composition IM predicts the behavior. More specifically, the simulation apparatus 1 can simulate the behavior of the curable composition IM in the process of bringing the plurality of droplets of the curable composition IM arranged on the substrate S and the mold M into contact with each other and forming a film of the curable composition IM in the space between the substrate S and the mold M.

The simulation apparatus 1 can be formed by, for example, incorporating a simulation program 21 in a general-purpose or dedicated computer. Alternatively, the simulation apparatus 1 can be formed by a PLD (the abbreviation of a Programmable Logic Device) such as an FPGA (the abbreviation of a Field Programmable Gate Array) or an ASIC (the abbreviation of an Application Specific Integrated Circuit). In one example, the simulation apparatus 1 can be formed by preparing a computer including a processor 10, a memory 20, a display 30, and an input device 40 and storing the simulation program 21 in the memory 20. The memory 20 may be a semiconductor memory, a disk such as a hard disk, or a memory of another form. The simulation program 21 can be stored in a computer-readable memory medium or provided to the simulation apparatus 1 via a communication facility such as a telecommunication network.

FIG. 2 exemplifies the relationships between nominal values and actual values. FIG. 2 exemplifies the positions of droplets (to also be referred to as drops hereinafter) of the curable composition IM arranged on the substrate S by the dispenser DSP. The simulation apparatus 1 can generate a drop setting file 201 by performing an optimization process so as to fill the shot region between the substrate S and the mold M with the curable composition IM without any gap by setting an initial drop setting file (not shown) as a start point. The optimization process can be executed under a simulation reference condition. The simulation reference condition is a parameter value considered in a simulation of the behavior of the curable composition. More specifically, the simulation reference condition is a parameter value when, for example, the film forming apparatus IMP has no manufacturing error (individual error), the operation environment of the film forming apparatus IMP is a reference environment, and the substrate S and the mold M are in a reference state. In the drop setting file 201, the position of each drop is defined by a nominal value. The drop setting file 201 can be generated commonly for a plurality of film forming apparatuses IMP having individual errors.

A term "nominal value" can be used as a term for defining the state (for example, the position of a drop) of an adjustment target, and can also be used as a term indicating the state (for example, the operation environment (for example, a temperature or the like) of the film forming apparatus IMP) of an element other than the adjustment target. The former nominal value is a value decided in a process of generating the drop setting file 201, and the latter nominal value is a parameter value (simulation reference condition) considered in the generation process of generating the drop setting file 201.

In the example shown in FIG. 2, three film forming apparatuses IMP are assumed and identified as film forming apparatuses IMP #1, IMP #2, and IMP #3. Difference files 202, 203, and 204 include pieces of information indicating the differences of actual values in the film forming apparatuses IMP #1, IMP #2, and IMP #3 with respect to the nominal values in the drop setting file 201, respectively. For example, No.=1 (the identifier of a drop) in the difference file 202 indicates that when a drop is arranged on the substrate S by setting (0, 0) as a target value in accordance with the drop setting file 201, the drop is actually arranged at (−0.1, 0).

A corrected drop setting file 205 can be generated by the simulation apparatus 1 based on the drop setting file 201 and the difference file 202 for the film forming apparatus IMP #1. The corrected drop setting file 205 provides a position (actual value #1) at which a drop is actually arranged in the film forming apparatus IMP #1 that operates in accordance with the drop setting file 201. A corrected drop setting file 206 can be generated by the simulation apparatus 1 based on the drop setting file 201 and the difference file 203 for the film forming apparatus IMP #2. The corrected drop setting file 206 provides a position (actual value #2) at which a drop is actually arranged in the film forming apparatus IMP #2 that operates in accordance with the drop setting file 201. A corrected drop setting file 207 can be generated by the simulation apparatus 1 based on the drop setting file 201 and the difference file 204 for the film forming apparatus IMP #3. The corrected drop setting file 207 provides a position (actual value #3) at which a drop is actually arranged in the film forming apparatus IMP #3 that operates in accordance with the drop setting file 201.

Using, as input information (simulation condition), information defined in the corrected drop setting file 205, the simulation apparatus 1 can simulate the behavior of the curable composition in the film forming apparatus IMP #1 that operates in accordance with the drop setting file 201. Using, as input information (simulation condition), information defined in the corrected drop setting file 206, the simulation apparatus 1 can simulate the behavior of the curable composition in the film forming apparatus IMP #2 that operates in accordance with the drop setting file 201. Furthermore, using, as input information (simulation condition), information defined in the corrected drop setting file 207, the simulation apparatus 1 can simulate the behavior of the curable composition in the film forming apparatus IMP #3 that operates in accordance with the drop setting file 201.

FIG. 3 exemplifies the nominal values and the actual values #1 and #2, and #3 with respect to the arrangement positions of the drops shown in FIG. 2, and the accuracy ranges of the arrangement positions of the drops by the dispenser DSP. As exemplified in FIG. 3, the position of each drop that can be arranged on the substrate S by each of the actual film forming apparatuses IMP #1, IMP #2, and IMP #3 in accordance with the drop setting file 201 can be shifted from the nominal value within the accuracy range. Therefore, as described above, in a behavior simulation based on the nominal values, it is impossible to accurately simulate the behavior of the curable composition (drops) in each of the actual film forming apparatuses IMP #1, IMP #2, and IMP #3. To cope with this, the simulation apparatus 1 simulates the behavior of the curable composition in the film forming apparatus IMP #1 based on the corresponding corrected drop setting file 205. The simulation apparatus 1 simulates the behavior of the curable composition in the film forming apparatus IMP #2 based on the corresponding corrected drop setting file 206. Furthermore, the simulation apparatus 1 simulates the behavior of the curable composition in the film forming apparatus IMP #3 based on the corresponding corrected drop setting file 207.

Figure 4:
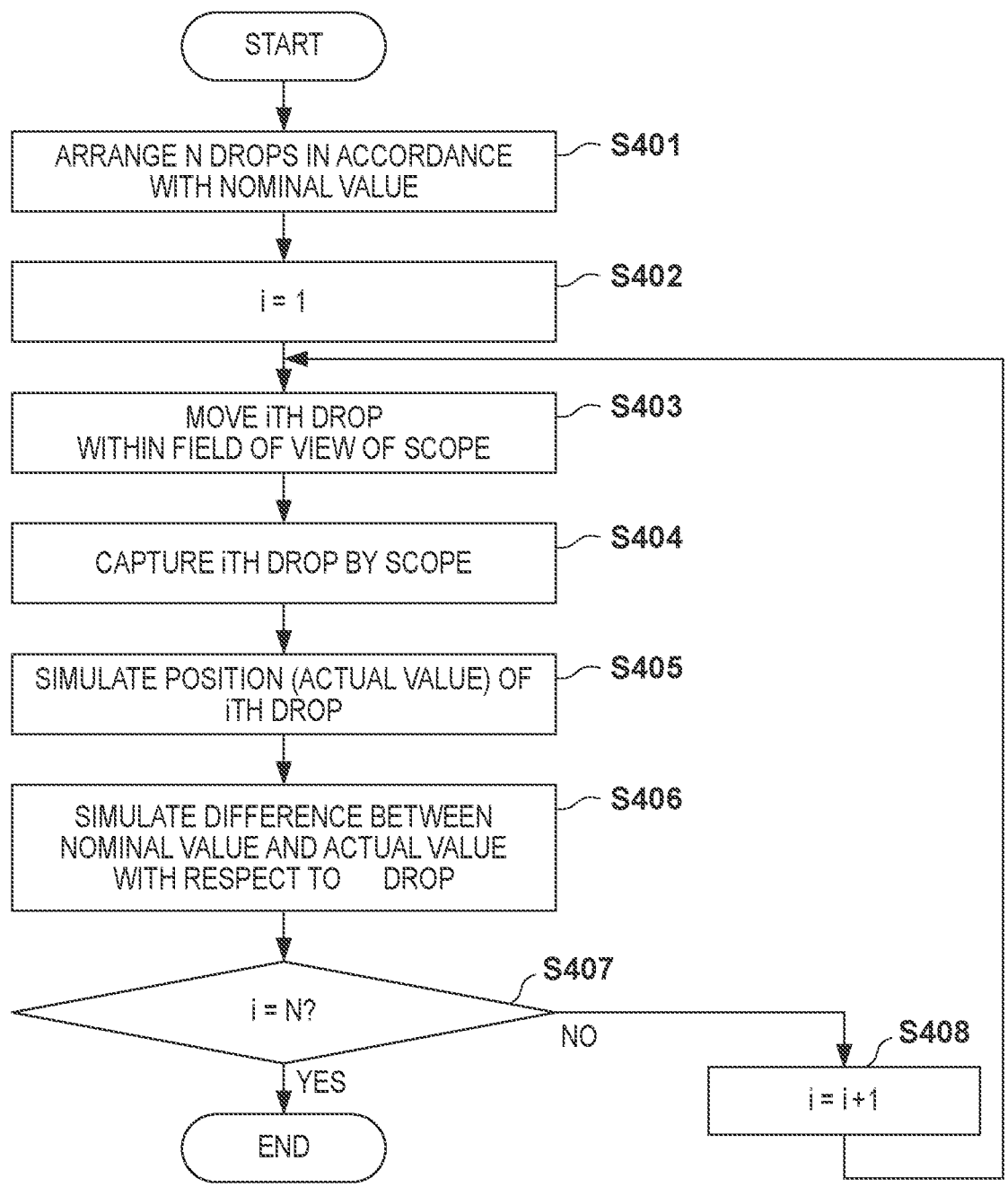
FIG. 4 is a flowchart illustrating a difference file generation process of generating a difference file.

FIG. 4 exemplifies the difference file generation process of generating a difference file. The difference file generation process can be executed in the film forming system MFS. In step S401, the film forming apparatus IMP can arrange N drops of the curable composition IM on a predetermined region (for example, one shot region) of the substrate S in accordance with the drop setting file 201 defined by the nominal values. N can be, for example, several tens of thousands.

Figure 5A:
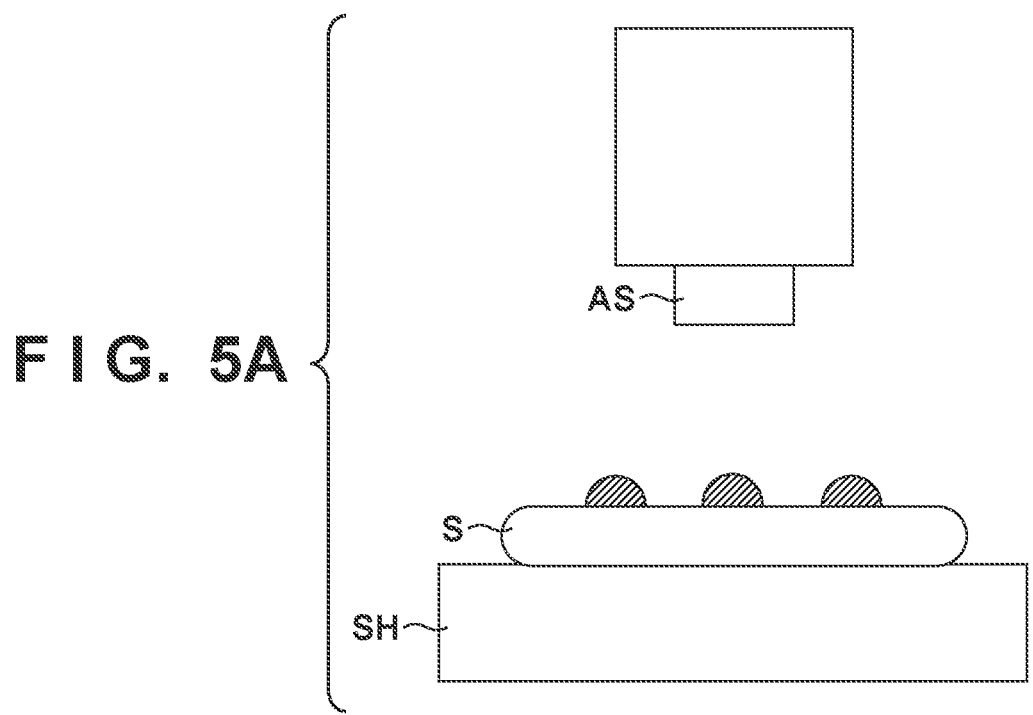
FIGS. 5A and 5B are views schematically showing a process of measuring the position of a drop.
Figure 5B:
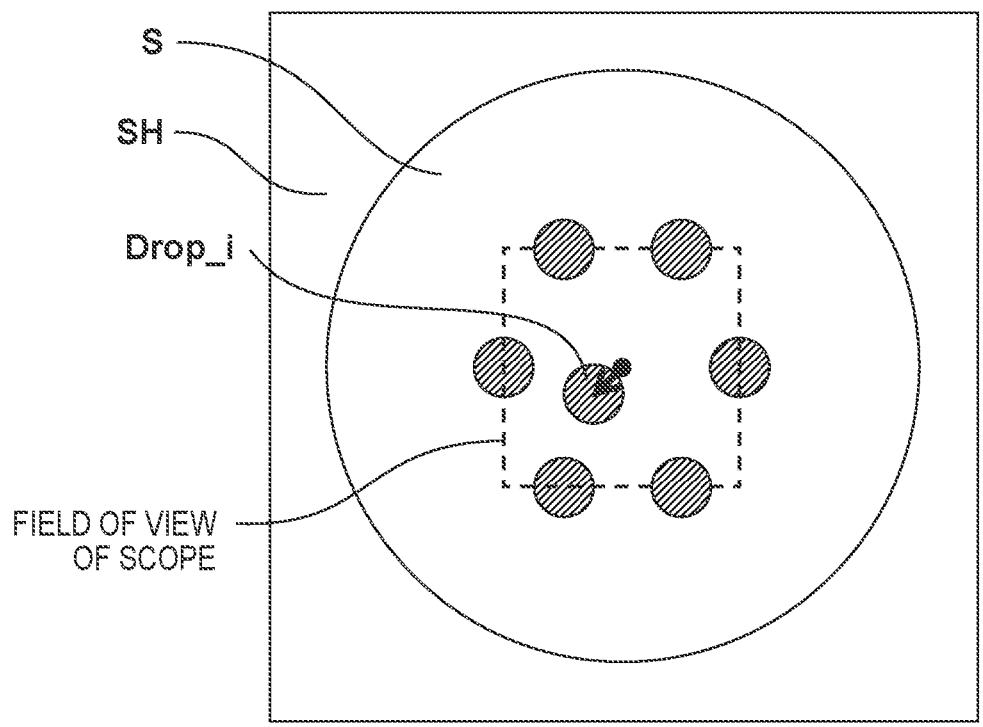

In step S402, the film forming apparatus IMP or the simulation apparatus 1 initializes, to 1, a parameter value i to be used in the following process. In step S403, as schematically shown in FIGS. 5A and 5B, the film forming apparatus IMP drives the substrate S by the driving mechanism SD so that an ith drop drop_i among the N drops arranged in step S401 is arranged around the center of the field of view of the scope AS. In this example, the ith drop drop_i can be positioned at a position shifted from the center of the field of view of the scope AS by an amount of the arrangement error of the ith drop drop_i by the dispenser DSP by ignoring the driving error of the driving mechanism SD. In step S404, the film forming apparatus IMP captures the ith drop drop_i by the scope AS. The scope AS is an example of an image sensor for obtaining or capturing an image. A drop other than the drop drop_i can fall within the field of view of the scope AS but the ith drop drop_i is closest to the center of the field of view.

In step S405, the film forming apparatus IMP or the simulation apparatus 1 simulates the position of the ith drop drop_i based on the image captured by the scope AS in step S404. The simulated position of the ith drop drop_i is an actual value (measurement value) measured using the scope AS. In step S406, the film forming apparatus IMP or the simulation apparatus 1 simulates the difference between the nominal value and the actual value simulated in step S404 with respect to the position of the ith drop drop_i, and writes the difference in a difference file. In step S407, the film forming apparatus IMP or the simulation apparatus 1 determines whether steps S403 to S406 have been executed for all the N drops arranged in step S401 (that is, whether i=N). If it is not determined that i=N, the film forming apparatus IMP or the simulation apparatus 1 adds 1 to i in step S408 and executes steps S403 to S406; otherwise, the film forming apparatus IMP or the simulation apparatus 1 ends the difference file generation process shown in FIG. 4.

Figure 6:
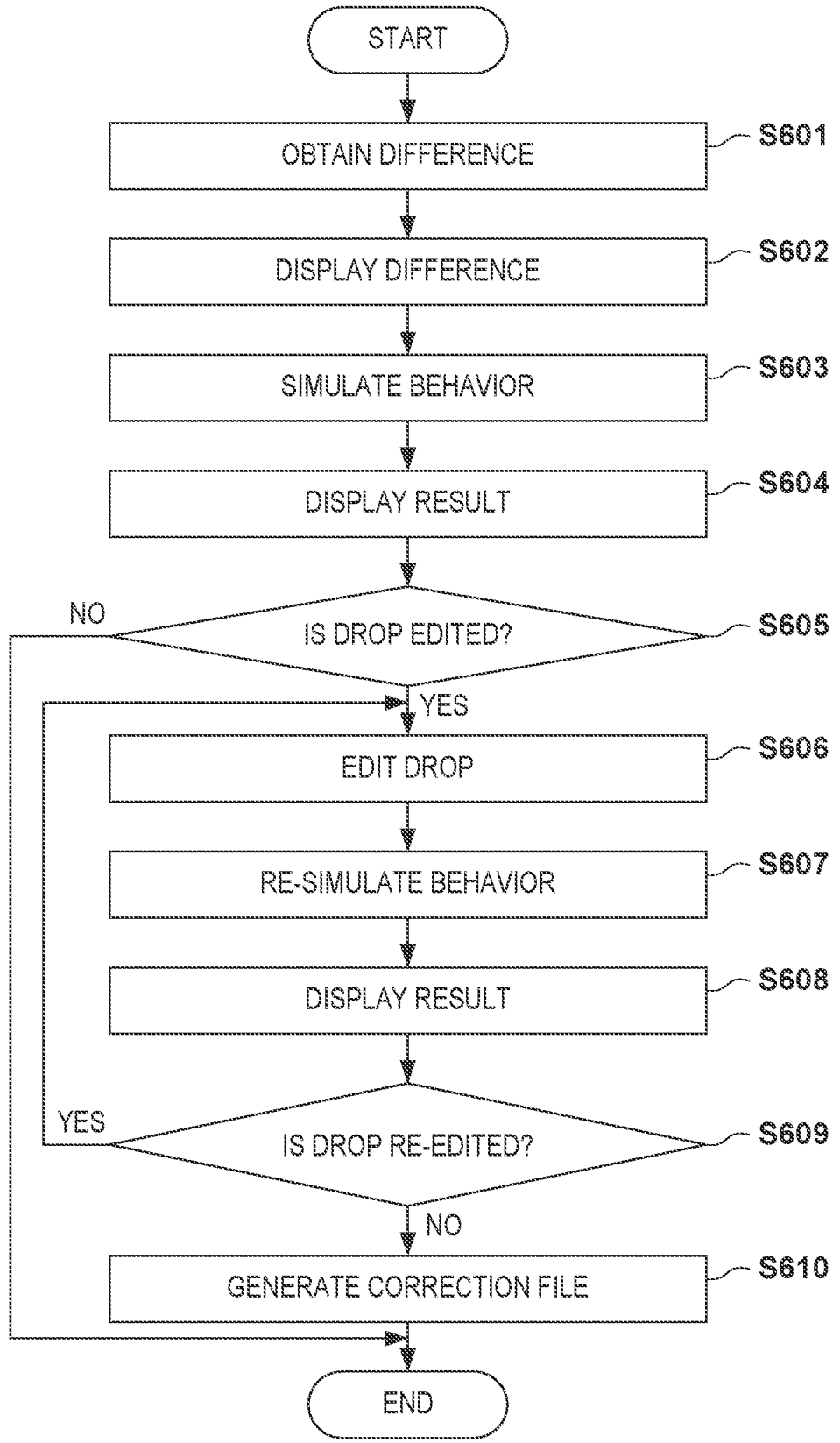
FIG. 6 is a flowchart illustrating a correction process executed by the simulation apparatus.

FIG. 6 exemplifies a correction process executed by the simulation apparatus 1. The correction process includes a behavior simulation of simulating the behavior of the curable composition. In step S601 (obtaining step), the processor 10 obtains the difference file generated by the difference file generation process shown in FIG. 4. The processor 10 can obtain, from the film forming apparatus IMP, the difference file corresponding to the film forming apparatus IMP as a simulation target. For example, if the film forming apparatus IMP as a simulation target is the film forming apparatus IMP #1, the processor 10 can obtain the difference file 202 from the film forming apparatus IMP #1. The processor 10 may be regarded as a device including an obtaining unit that executes step S601 (obtaining step).

Figure 7C:
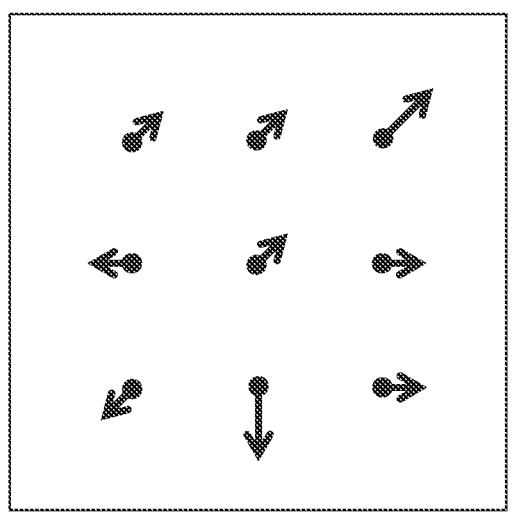
FIGS. 7A to 7C are views each showing an example of display of difference information indicating differences between nominal values and actual values corresponding to them.

In step S602 (display step or difference display step), the processor 10 can display, on the display screen of the display 30, difference information indicating the difference between each nominal value and its corresponding actual value based on the difference file obtained in step S601. More specifically, the processor 10 can display, on the display screen of the display 30, difference information indicating the difference between each nominal value and its corresponding actual value based on information indicating the difference included in the difference file obtained in step S601, as exemplified in FIG. 7A. An image displayed on the display screen of the display 30 can be a map image obtained by mapping the difference information on a member image representing the substrate S (first member). The user can confirm the difference between each nominal value and its actual value based on the difference information displayed on the display screen of the display 30. In the example shown in FIG. 7A, with respect to the difference between each nominal value and its corresponding actual value, a shift direction is indicated by the direction of an arrow and a shift amount is indicated by the length of the arrow. FIG. 7A shows only nine drops but more drops can actually be displayed. The simulation apparatus 1 may compare each difference with a threshold, and display, on the display screen of the display 30, a drop having the difference exceeding the threshold while emphasizing the drop more than that having the difference not exceeding the threshold. Alternatively, the simulation apparatus 1 may enlarge and display, on the display screen of the display 30, a region designated by the user or a region where a drop having the difference exceeding the threshold is arranged. Alternatively, the simulation apparatus 1 may have a mode of displaying, on the display screen of the display 30, a list of a plurality of drops sorted in descending order of difference.

In step S603 (simulation step), the processor 10 can execute a behavior simulation of simulating the behavior of the curable composition IM using, as input information (simulation condition), the actual values indicating the actual conditions obtained from the differences obtained in step S601 and their corresponding nominal values. More specifically, the processor 10 can first generate a corrected drop setting file based on the difference file obtained in step S601 and the drop setting file 201 defined by the nominal values. Next, the processor 10 can simulate the behaviors of all the drops of the curable composition IM based on the corrected drop setting file. For example, if the film forming apparatus IMP as a simulation target is the film forming apparatus IMP #1, the corrected drop setting file 205 is generated and is used as input information (simulation condition). The processor 10 may be regarded as a device including a simulator that executes step S603 (simulation step).

Figure 7B:
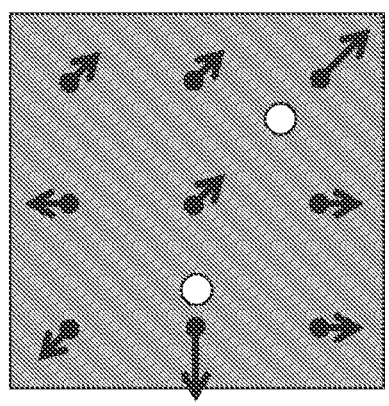
Figure 7A:
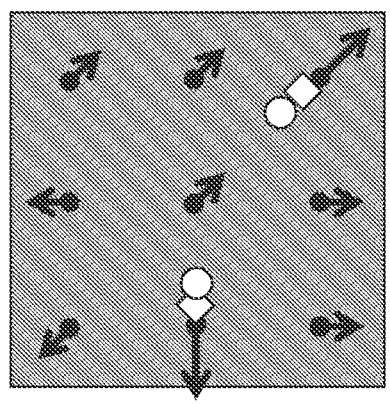

In step S604 (display step or result display step), the processor 10 can display, on the display screen of the display 30, a result of the simulation in step S603, that is, an image representing the behaviors of the drops of the curable composition IM, as exemplified in FIG. 7B. In an example shown in FIG. 7B, a filled region that is filled with the curable composition IM in the space between the substrate S and the mold M is hatched, and an unfilled region that is not filled with the curable composition IM is represented by white. The unfilled region is a region where there exists a bubble. In the example shown in FIG. 7B, the differences between nominal values and their corresponding actual values are also displayed. That is, step S604 can include a defect display step of displaying information indicating the position of the unfilled region together with the difference information, and in the defect display step, a map image on which the unfilled region is mapped can be displayed on the display screen of the display 30 in addition to the difference information. Even if there is no unfilled region when simulating the behavior of the curable composition based on the drop setting file 201 defined by the nominal values, an unfilled region can be generated when simulating the behavior of the curable composition based on the actual values.

In step S605, the processor 10 causes the user to decide whether to edit the positions of the drops of the curable composition IM to be arranged on the substrate S. If the positions of the drops are to be edited, the process advances to step S606; otherwise, the correction process shown in FIG. 6 ends. In step S606 (editing step), the processor 10 edits the positions of the drops of the curable composition IM on the substrate S. This editing operation may be executed in accordance with a user operation or executed by the processor 10 in accordance with an automatic editing algorithm. FIG. 7C exemplifies the operation of editing the positions of the drops. For example, the editing operation of changing the position of a drop closest to the unfilled region so as to be closer to the unfilled region is usable to make the unfilled region disappear. This editing operation can be executed in accordance with a user operation or the automatic editing algorithm. In the example shown in FIG. 7C, the position of the drop after the editing operation is indicated by a rectangle.

In step S607 (re-simulation step), the processor 10 can execute a behavior simulation of re-simulating the behaviors of all the drops of the curable composition IM using, as input information (simulation condition), the positions of the drops after the editing operation in step S606. In step S608 (display step or result display step), the processor 10 can display, on the display screen of the display 30, an image indicating a result (the behaviors of the drops of the curable composition IM) of the re-simulation in step S607.

In step S609, the processor 10 causes the user to decide whether to edit the positions of the drops of the curable composition IM to be arranged on the substrate S. If the positions of the drops are to be edited, the process advances to step S606; otherwise, the process advances to step S610. In step S610, the processor 10 can generate a correction file for the film forming apparatus IMP as a simulation target. For example, the correction file can include, for each drop, a correction value obtained by simulating the difference between the actual value simulated in step S603 and the position of the drop decided in step S606 executed last. In this case, the drop setting file 201 and the correction file generated in step S606 can be provided to the film forming apparatus IMP as a simulation target. The film forming apparatus IMP can arrange the drops of the curable composition IM on the substrate S in accordance with the corrected drop setting file obtained by correcting the drop setting file 201 in accordance with the correction file. Alternatively, in step S610, such corrected drop setting file may be generated and provided to the film forming apparatus IMP.

Figure 8A:
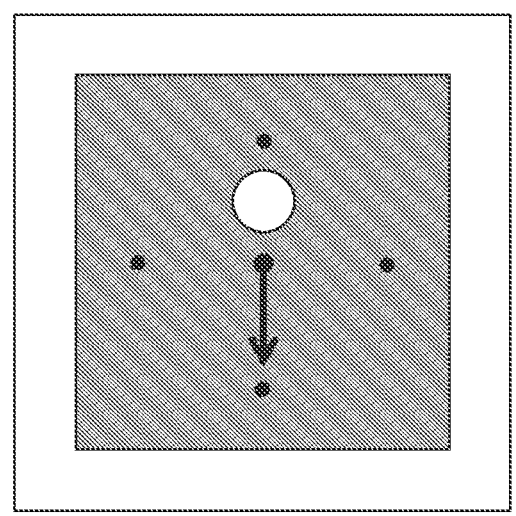
FIGS. 8A to 8C are views each showing an example of display of an unfilled region and difference information indicating the difference between a nominal value and its corresponding actual value.
Figure 8B:
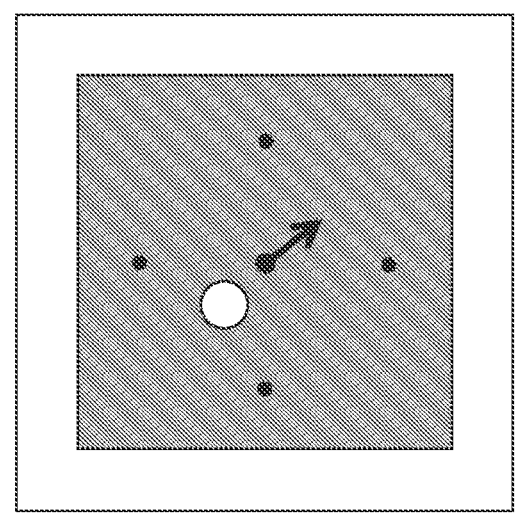
Figure 8C:
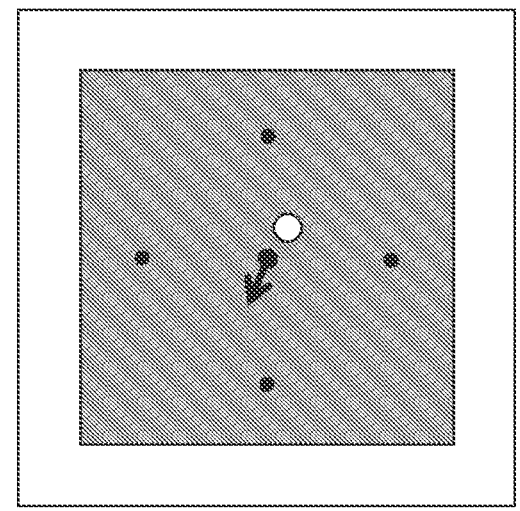

FIGS. 7A to 7C show only nine drops for the sake of descriptive convenience. However, more drops can actually exist. Therefore, it is inefficient for the user to confirm whether there exists an unfilled region around each drop. To cope with this, in steps S604 and S608, the processor 10 may sort the drops each having a large difference between the nominal value and the actual value in descending order of difference, display a simulation result on the display screen of the display 30 in that order, and prompt the user to make a confirmation. This can contribute to an efficient editing operation of the positions of the drops. FIGS. 8A to 8C each schematically show a user interface. The processor 10 can display the simulation result on the display screen of the display 30 in descending order of difference, that is, in the order of FIGS. 8A, 8B, and 8C. In this example, the descending order of difference matches a descending order of unfilled region.

As exemplified in FIGS. 2 and 3, there are individual differences among the plurality of film forming apparatuses IMP #1, IMP #2, and IMP #3. Considering the distribution of the individual differences may be useful to decide the drop setting file 201 so as to decrease a correction amount by the correction file provided to each film forming apparatus IMP.

The difference between the nominal value and the actual value with respect to the arrangement position of each drop can be obtained by evaluating a result of arranging the drop using the drop setting file 201 in the film forming apparatus IMP as a simulation target, as described above. However, the drop may be arranged using a drop setting file for evaluation different from the drop setting file 201 to decide the difference between the nominal value in the drop setting file and the measured actual value. Based on the difference, a difference file corresponding to the drop setting file 201 for manufacturing a device may be generated by, for example, interpolation or extrapolation.

In operating the film forming apparatus, to confirm whether the performance changes with time, a test of various items called QC (Quality Control) can be performed periodically. This test can include measurement of the difference between a target position and an actual position with respect to the arrangement position of each drop. In this case, a difference file can be generated using the result. This can obtain a difference file on which the latest state of the film forming apparatus is reflected, without performing the dedicated difference file generation process exemplified in FIG. 4.

The difference file or difference may be generated not from the evaluation result of the film forming apparatus IMP but from the evaluation result of only the dispenser DSP.

Before the dispenser DSP is mounted on the film forming apparatus IMP, various tests can be performed for only the dispenser DSP to ensure the performance of only the dispenser DSP. These tests can include measurement of the difference between the nominal value and the actual value with respect to the arrangement position of each drop. Therefore, a difference file may be generated based on the result of the tests. Furthermore, a difference (second difference component) unique to the film forming apparatus IMP may be obtained from the difference (total difference) obtained by the difference file generation process exemplified in FIG. 4 and the difference (first difference component) obtained by the test of only the dispenser DSP. If the dispenser DSP is replaced, the total difference can be obtained based on the first difference component of only the dispenser DSP after replacement and the second difference component, and the difference file can be generated based on the total difference. This can reduce the number of steps of generating the difference file.

The example of considering the difference between the nominal value and the actual value with respect to the arrangement position of each drop in the correction process or behavior simulation has been explained above. In the correction process or behavior simulation, the difference between a nominal value and an actual value with respect to the volume of each drop may be considered. In this case, a drop can be arranged on the substrate S by the film forming apparatus IMP as a simulation target using the drop setting file to be used by the film forming apparatus IMP, and the volume of the drop can be measured using the image sensor such as the scope AS. Then, a difference file formed by the difference between a nominal value for the volume of each drop defined in the drop setting file and the measured volume (actual value) of the drop can be generated by the difference file generation process. The correction process or behavior simulation by the simulation apparatus 1 can be executed in accordance with such difference file.

Figure 9:
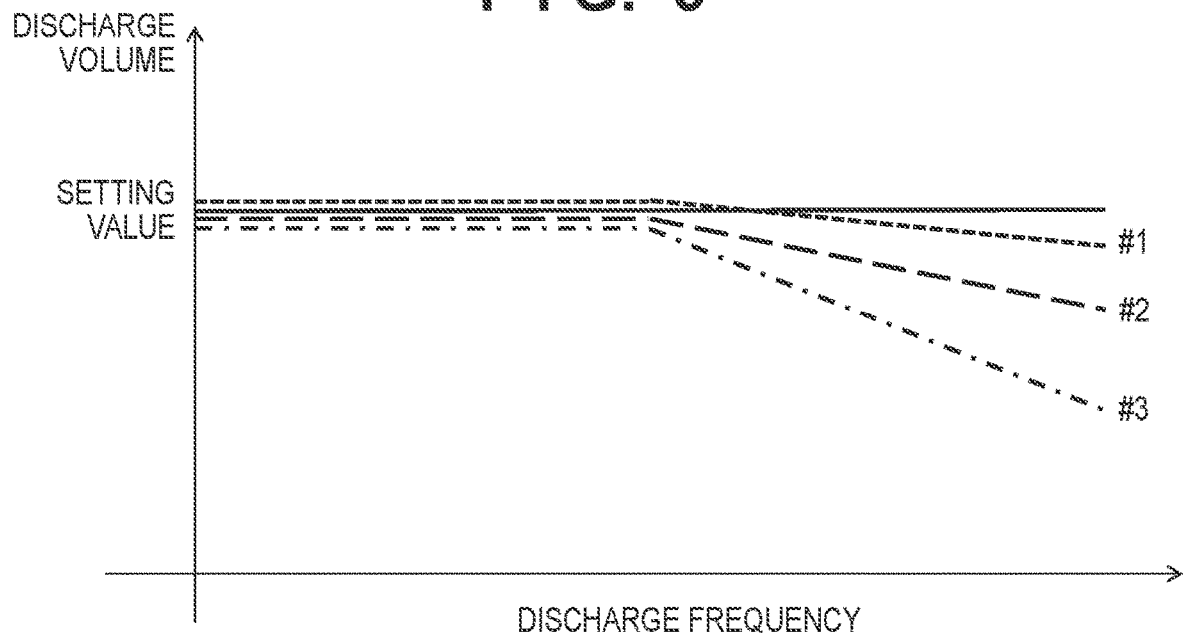
FIG. 9 is a graph exemplifying the relationship between a discharge frequency and a discharge volume.

FIG. 9 schematically shows the relationship between a discharge frequency and a discharge volume with respect to the dispenser DSP of each of the film forming apparatuses IMP #1, IMP #2, and IMP #3. The three dispensers DSP are identified by #1, #2, and #3. The discharge frequency is a frequency at which a drop is discharged. An increase in discharge frequency indicates a decrease in temporal interval (as a result, a spatial interval (distance)) at which a drop is discharged. The discharge volume is the volume of a drop. When the discharge frequency is low, a drop of a volume almost equal to a setting value (command value). As the discharge frequency increases, the discharge volume decreases. The setting value of the discharge volume is regarded as a nominal value of the discharge volume.

Since the discharge frequency is decided by the interval (pitch) between drops defined in the drop setting file, the discharge frequency may be obtained from the interval between drops and the discharge volume may be corrected in accordance with the discharge frequency. Alternatively, a discharge simulation of the dispenser DSP may be performed using the discharge frequency as input information, and then the correction process or behavior simulation shown in FIG. 6 may be executed using a difference file formed by the difference between the obtained discharge volume and its corresponding nominal value. For the discharge simulation, as one example, a general fluid simulation of solving the flow of a curable bio-resin in the dispenser DSP can be used.

However, with respect to the decrease amount of the discharge volume caused by an increase in discharge frequency, there are individual differences among the dispensers DSP, as exemplified in FIG. 9. To reflect them on the correction process or behavior simulation, a difference file formed by the difference between a nominal value and a test result of the discharge volume only in each dispenser DSP can be prepared. Then, the correction process or behavior simulation can be executed based on the difference file and the drop setting file 201.

Figure 10:
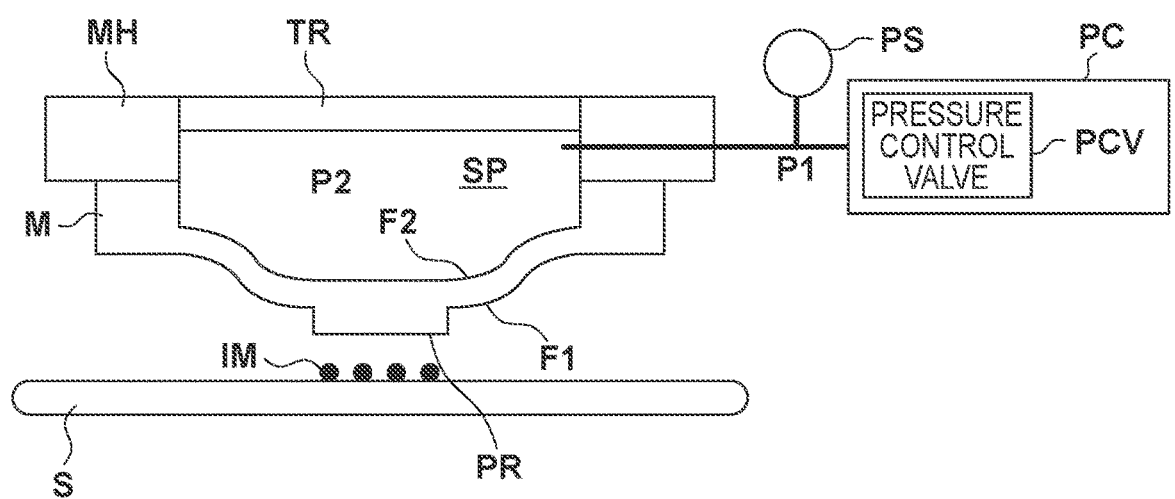
FIG. 10 is a view schematically showing a cavity space and its peripheral members.

The correction process or behavior simulation may consider the difference between a nominal value and an actual value with respect to the pressure of the space SP. FIG. 10 schematically shows the space SP and its peripheral members. The mold M can include a first surface F1 having the pattern region PR and a second surface F2 on the opposite side of the first surface F1, and the film forming apparatus IMP can include the transmissive member TR for forming the space SP on the side (the opposite side of a surface opposing the substrate S) of the second surface F2 of the mold M. The space SP can also be called a cavity space. The pressure controller PC can control deformation of the mold M in the Z-axis direction by controlling the pressure of the space SP. When the pressure controller PC makes the pressure of the space SP higher than the atmospheric pressure, the mold M can be deformed in a convex shape toward the substrate S. On the other hand, when the pressure controller PC returns the pressure of the space SP to the atmospheric pressure, the mold M can return to the flat state. The pressure controller PC can include a pressure control valve PCV that controls the pressure of the space SP. A setting value (pressure command value) for the pressure control valve PCV is regarded as a nominal value of the pressure of the space SP. The film forming apparatus IMP can include a pressure sensor PS that measures a pressure P1 of a connection path between the pressure controller PC and the space SP. The film forming apparatus IMP can bring the pattern region PR of the mold M into contact with the drops of the curable composition IM arranged on the substrate S in a state in which the pressure controller PC deforms the mold M in a convex shape toward the substrate S. After the drops and the pattern region PR are brought into contact with each other, the film forming apparatus IMP can cause the pressure controller PC to return the mold M to the flat state.

Figure 11:
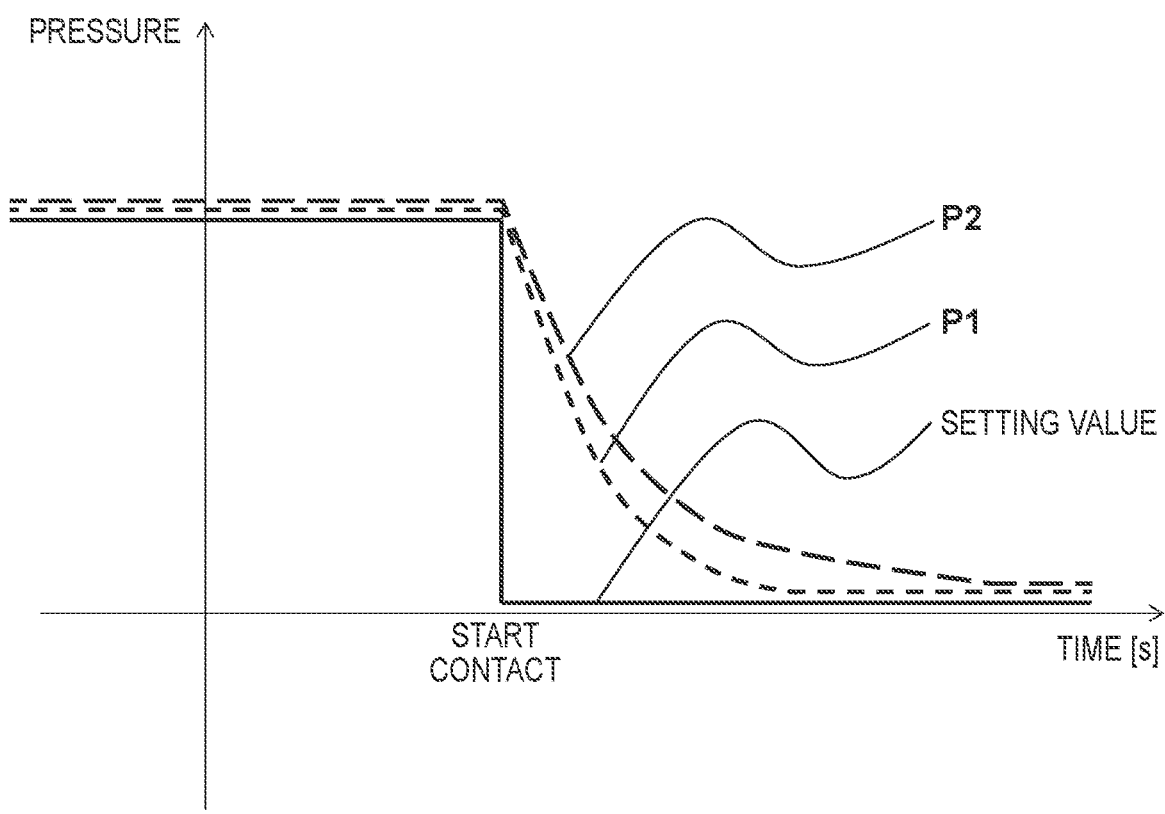
FIG. 11 is a timing chart exemplifying the relationship among a setting value for a pressure control valve, a pressure measured by a pressure sensor, and the pressure of the cavity space.

FIG. 11 exemplifies the relationship among the setting value (nominal value) for the pressure control valve PCV, the pressure P1 measured by the pressure sensor PS, and a pressure P2 of the space SP. There can be a difference corresponding to the characteristic of the pressure control valve PCV between the pressure P1 and the setting value (nominal value) for the pressure control valve PCV. Therefore, in a simulation using the drop setting file 201 generated by setting the setting value for the pressure control valve PCV as a nominal value indicating the pressure of the space SP, it may be impossible to accurately simulate the behavior of the curable composition.

To cope with this, a difference file formed by the difference between the setting value (nominal value) for the pressure control valve PCV and the pressure P1 (actual value) measured by the pressure sensor PS can be prepared. Then, the correction process or behavior simulation can be executed based on the difference file and the drop setting file 201. The setting value (nominal value) for the pressure control valve PCV and the pressure P1 measured by the pressure sensor PS can be given by a function of time of time-series data.

Furthermore, the difference between the pressure P1 measured by the pressure sensor PS and the actual pressure P2 of the space SP may be considered. This difference can be generated by, for example, the volume of the space SP and the flow resistance between the pressure sensor PS and the space SP. Thus, by analyzing the relationship between the setting value (nominal value) for the pressure control valve PCV and the pressure P2 of the space SP by a fluid simulator, the difference between the setting value (nominal value) and the pressure P2 (actual value) of the space SP may be obtained, thereby generating a difference file. At this time, the difference between the pressure P1 of the space SP and the pressure P2 (actual value) of the space SP may be obtained by analyzing the relationship with the pressure P1 by the fluid simulator, and then the relationship between the setting value (nominal value) for the pressure control valve PCV and the pressure P2 of the space SP may be obtained based on the obtained difference.

Additionally or alternatively, the difference between the nominal value of a pressure applied to the substrate S to hold the substrate S by the substrate holder SH that holds the substrate S and the actual value (simulated value or actually measured value) may be considered. Furthermore, the difference between a nominal value of a force of pressing the mold M against the curable composition IM on the substrate S and an actual value (simulated value or actually measured value) may be considered.

Figure 12A:
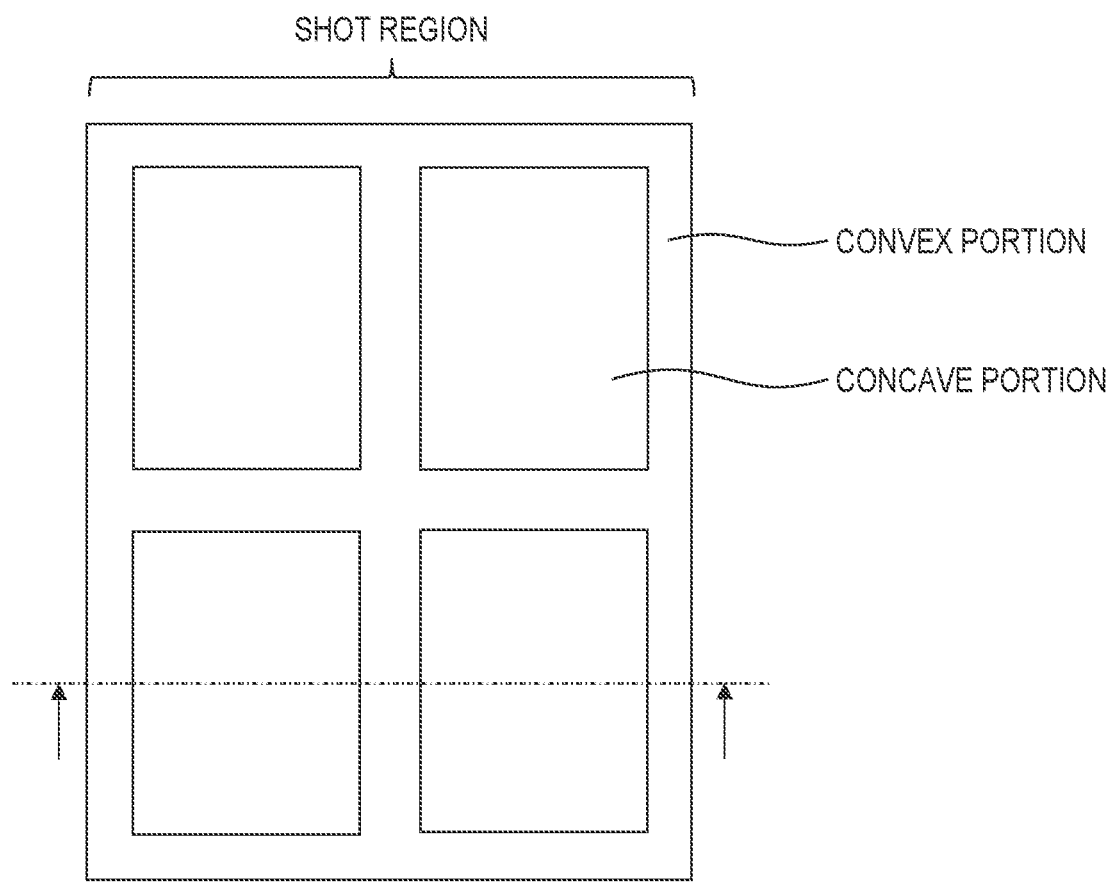
FIGS. 12A and 12B are views schematically showing unevenness of the surface of a shot region of a substrate.
Figure 12B:
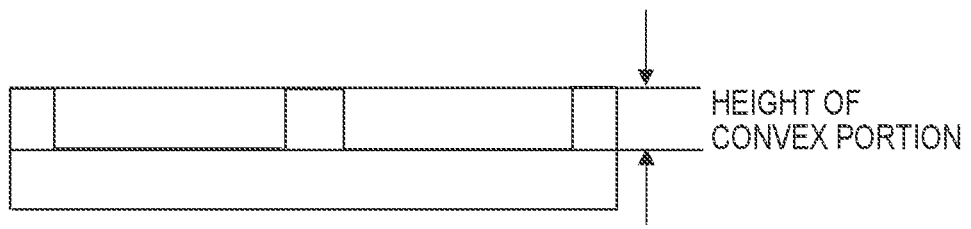

In the correction process or behavior simulation, the difference between a nominal value and an actual value with respect to unevenness (step) of the surface of the substrate S may be considered. FIGS. 12A and 12B schematically show unevenness of the shot region of the substrate S. FIG. 12A is a plan view and FIG. 12B is a sectional view. Unevenness (nominal value) of the surface of the shot region considered to generate the drop setting file 201 may be different from unevenness (actual value) of the surface of the actual shot region. In this case, a difference file formed by the difference between them can be generated, and the correction process or behavior simulation can be executed based on the difference file and the drop setting file 201.

The actual value (for example, a position function) indicating unevenness of the surface of the shot region of the substrate S can be obtained when, for example, the film forming apparatus IMP or another apparatus measures the surface shape (height distribution) of the substrate S using, for example, non-contact distance sensor. If the plurality of substrates S form a lot, the surface shape of the shot region can be measured by targeting the substrate S representing the lot. The surface shape may be measured for all or some (at least one) of the shot regions of the substrate S representing the lot.

Figure 13:
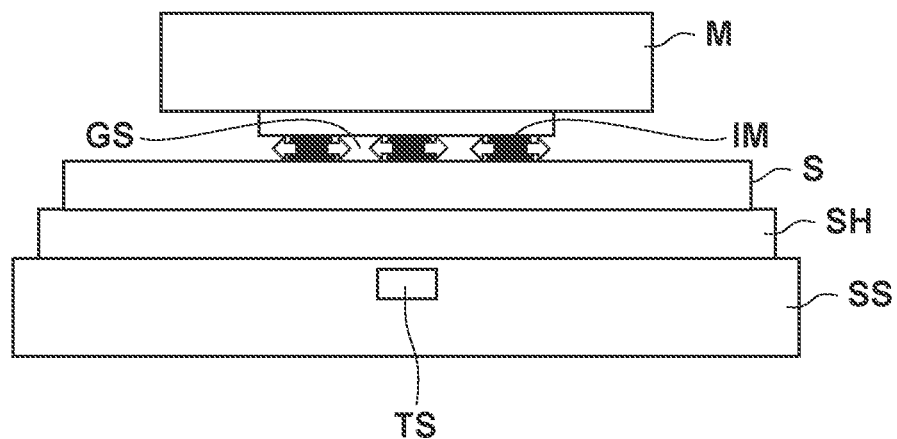
FIG. 13 is a view schematically showing a process of filling a space between the substrate and a mold with a curable composition.

In the correction process or behavior simulation, the difference between a nominal value and an actual value with respect to the physical property value of the curable composition IM may be considered. FIG. 13 schematically shows a process of filling the space between the substrate S and the mold M with the curable composition IM. In the correction process or behavior simulation, the physical property value (for example, a surface tension or viscosity) of the curable composition IM can be considered. Such physical property value can change in accordance with the temperature.

To cope with this, in the correction process or behavior simulation, the difference between a nominal value and an actual value with respect to the temperature of the curable composition IM may be considered. As the actual value of the temperature of the curable composition IM, for example, the temperature measured by a temperature sensor TS arranged in the substrate holder SH or a substrate stage SS that supports the substrate holder SH can be used. The temperature of the substrate stage SS can change in accordance with the operating state of the substrate stage SS. Since a drop of the curable composition IM arranged on the substrate S by the dispenser DSP has a small heat capacity, it is considered that the temperature of the curable composition follows the temperature of the substrate holder SH or the substrate stage SS. Therefore, it is considered to be rational to use, as the actual value of the temperature of the curable composition IM, the temperature measured by the temperature sensor TS arranged in the substrate holder SH or the substrate stage SS.

Therefore, a difference file formed by the difference between the nominal value and the actual value with respect to the temperature of the curable composition IM can be generated, and the correction process or behavior simulation can be executed based on the difference file and the drop setting file 201. The simulation apparatus 1 simulates the behavior of the curable composition IM based on the physical property value of the curable composition IM corresponding to the actual value of the temperature given by the difference file (difference) and the nominal value.

In addition to or instead of the temperature of the curable composition IM, a pressure applied to the curable composition IM and/or the humidity in the space between the substrate S and the mold M may be considered.

Figure 14:
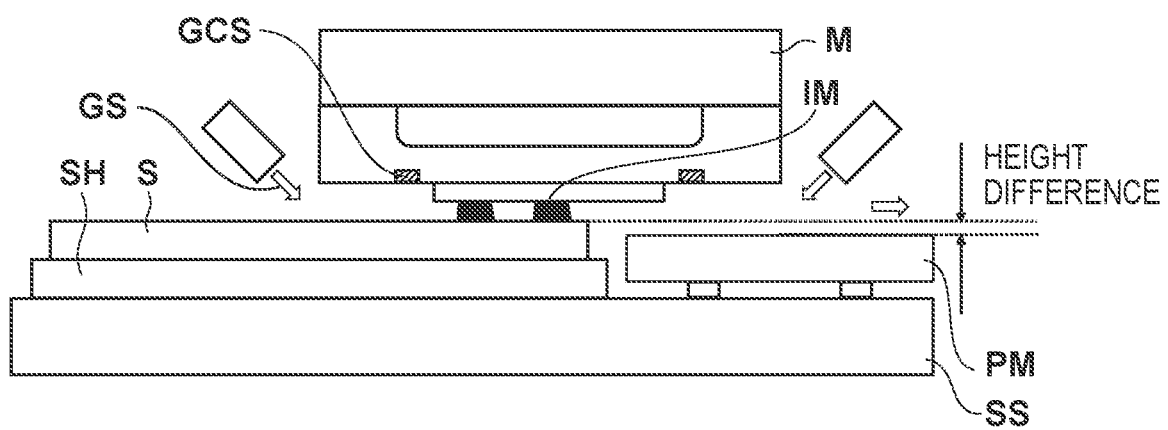
FIG. 14 is a view schematically showing an example of the peripheral structure of the substrate and mold in the film forming apparatus.
Figure 15:
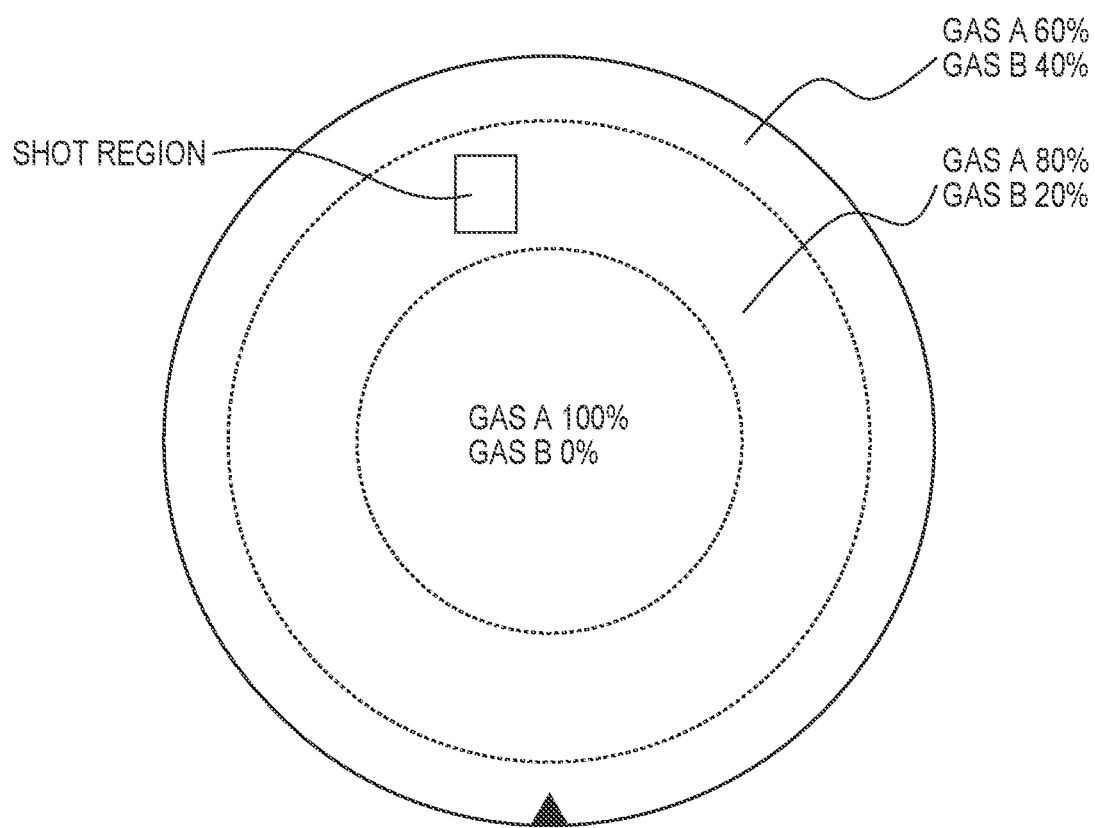
FIG. 15 is a view exemplifying a gas concentration on the substrate.

In the correction process or behavior simulation, the tolerance of a constituent component of the film forming apparatus IMP may be considered. The tolerance is a difference of an actual value with respect to a design value (nominal value). FIG. 14 schematically shows an example of the peripheral structure of the substrate S and the mold M in the film forming apparatus IMP. The film forming apparatus IMP can include a gas supply unit GS that supplies a gas (for example, a condensable gas or inert gas) to the space between the substrate S and the mold M. A plate member PM can be arranged in the periphery of the substrate S or the substrate holder SH. The plate member PM can function to assist supply of the gas to the space between the substrate S and the mold M by the gas supply unit GS. The plate member PM can include an upper surface having a height almost equal to that of the upper surface of the substrate S but the upper surface of the plate member PM can be designed to be slightly lower than the upper surface of the substrate S in order to prevent interference with the mold M and the like. Therefore, in the state shown in FIG. 14, the gas supplied from above the plate member PM leaks to the periphery more easily than the gas supplied from above the substrate S. Thus, the concentration of the gas around the substrate S can be lower than that of the gas at the center of the substrate S. FIG. 15 exemplifies the concentrations of gas A (GAS A) and gas B (GAS B) on the substrate S.

The height of the upper surface of the plate member PM can be different for each film forming apparatus IMP due to the tolerance. Thus, the concentration (concentration distribution) of the gas supplied by the gas supply unit GS onto the substrate S can be different for each film forming apparatus IMP. In one example, the drop setting file 201 can be generated by setting, as a nominal value of the gas concentration (gas concentration distribution), the gas concentration (gas concentration distribution) corresponding to a nominal value of the height of the upper surface of the plate member PM.

As exemplified in FIG. 14, a gas concentration sensor GCS can be provided and used to measure the gas concentration at the time of forming a film in each shot region. Alternatively, a database may be created by obtaining the gas concentration with respect to the tolerance by performing a fluid simulation while changing the height of the upper surface of the plate member PM within the range of the tolerance, and the gas concentration of the database may be obtained. This can generate a difference file formed by the difference between the nominal value and the actual value with respect to the gas concentration, and the correction process or behavior simulation can be executed based on the difference file and the drop setting file 201. The simulation apparatus 1 simulates the behavior of the curable composition IM based on the actual value of the gas concentration given by the difference file (difference) and the nominal value.

In the correction process or behavior simulation, the difference between a nominal value and an actual value with respect to an element other than the above-described ones may be considered. An example of the element is an element associated with the stiffness of the mold M, for example, the thickness distribution of a space SP forming portion of the mold M or the R dimension of the end portion of the space SP forming portion.

Figure 16:
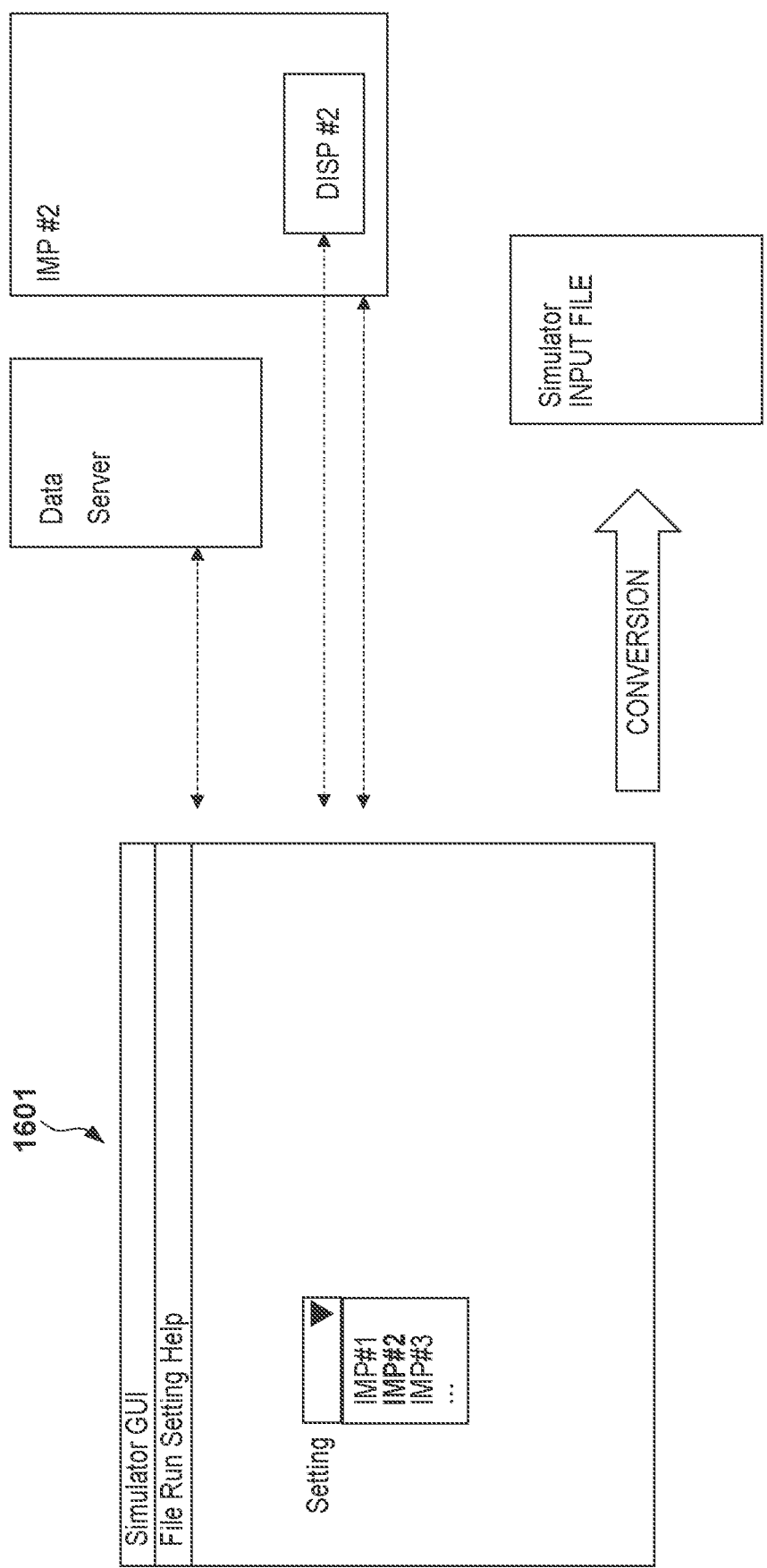
FIG. 16 is a view exemplifying a GUI provided to the display screen of the display of the simulation apparatus.

FIG. 16 exemplifies a GUI (Graphical User Interface) 1601 provided to the display screen of the display 30 of the simulation apparatus 1. The user can select the film forming apparatus IMP (for example, IMP #2) from a pulldown menu in the GUI 1601 to select the difference file for the selected film forming apparatus IMP. This allows the simulation apparatus 1 to simulate an actual value based on the drop setting file common to the plurality of film forming apparatuses IMP and the selected difference file, thereby executing the correction process or behavior simulation based on the actual value.

The film forming apparatus IMP in which the simulation apparatus 1 is incorporated can control, based on prediction of the behavior of the curable composition by the simulation apparatus 1, the process of bringing the curable composition arranged on the first member and the second member into contact with each other and forming a film of the curable composition on the first member.

A method of manufacturing an article according to an embodiment can include a step of deciding a condition of a process of bringing a curable composition arranged on a first member and the second member into contact with each other and forming a film of the curable composition on the first member while repeating the above-described simulation method, and a step of executing the process under the condition.

The mode in which the mold has a pattern has been explained above. However, the present invention is applicable to a mode in which the substrate has a pattern.

FIGS. 17A to 17F show a more detailed example of the method of manufacturing an article. As shown FIG. 17A, a substrate 1z such as a silicon wafer with a processed material 2z such as an insulator formed on the surface is prepared. Next, an imprint material 3z is applied to the surface of the processed material 2z by an inkjet method or the like. A state in which the imprint material 3z is applied as a plurality of droplets onto the substrate is shown here.

Figure 17A:
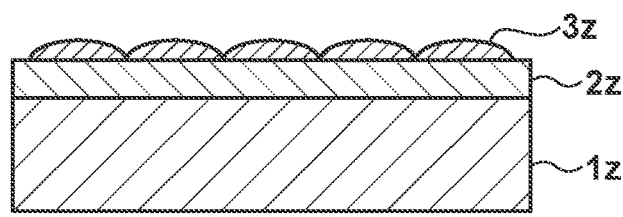
FIGS. 17A to 17F are views exemplifying a method of manufacturing an article.
Figure 17B:
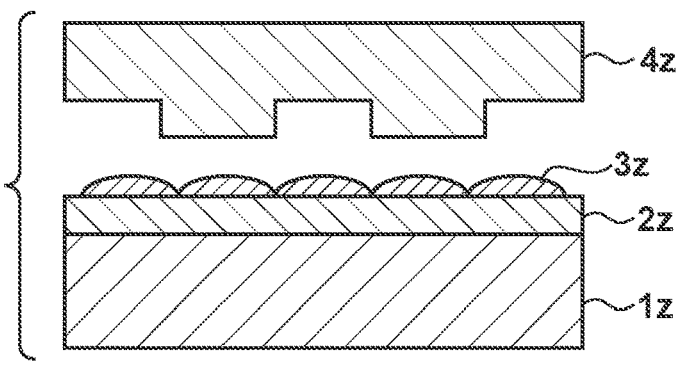
Figure 17C:
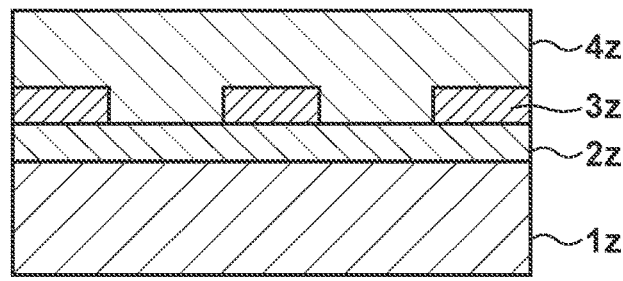

As shown in FIG. 17B, a side of a mold 4z for imprint with a concave-convex pattern is directed toward and made to face the imprint material 3z on the substrate. As shown FIG. 17C, the substrate 1z to which the imprint material 3z is applied is brought into contact with the mold 4z, and a pressure is applied. The gap between the mold 4z and the processed material 2z is filled with the imprint material 3z. In this state, when the imprint material 3z is irradiated with light as energy for curing via the mold 4z, the imprint material 3z is cured.

Figure 17D:
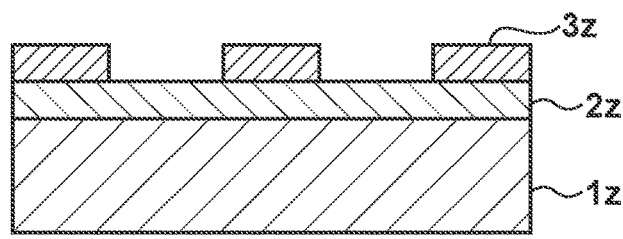

As shown in FIG. 17D, after the imprint material 3z is cured, the mold 4z is separated from the substrate 1z, and the pattern of the cured product of the imprint material 3z is formed on the substrate 1z. In the pattern of the cured product, the concave portion of the mold corresponds to the convex portion of the cured product, and the convex portion of the mold corresponds to the concave portion of the cured product. That is, the concave-convex pattern of the mold 4z is transferred to the imprint material 3z.

Figure 17E:
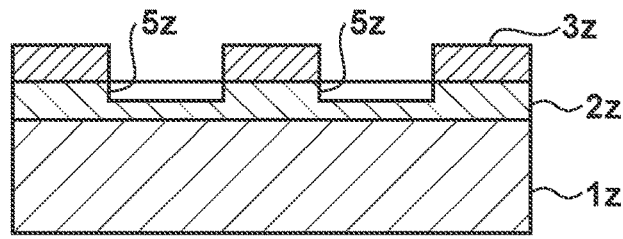
Figure 17F:
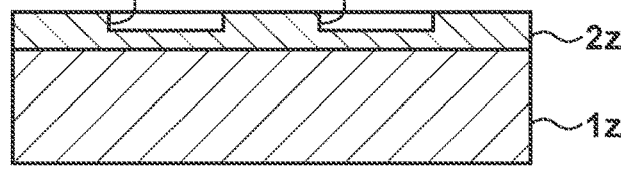

As shown in FIG. 17E, when etching is performed using the pattern of the cured product as an etching resistant mask, a portion of the surface of the processed material 2z where the cured product does not exist or remains thin is removed to form grooves 5z. As shown in FIG. 17F, when the pattern of the cured product is removed, an article with the grooves 5z formed in the surface of the processed material 2z can be obtained. Here, the pattern of the cured product is removed. However, instead of removing the pattern of the cured product after the process, it may be used as, for example, an interlayer dielectric film included in a semiconductor element or the like, that is, a constituent member of an article.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-124644, filed Jul. 21, 2020, which is hereby incorporated by reference herein in its entirety.

What is claimed is:

1. A method of forming an actual film of a curable composition in a film forming apparatus that brings the curable composition arranged on a first member and a second member into contact with each other to form the actual film of the curable composition on the first member, the method comprising:

generating a drop setting file by performing an optimization process so as to fill a space between the first member and the second member with the curable composition without any gap, wherein in the drop setting file, a state of each of a plurality of droplets of the curable composition is defined as a nominal value;

obtaining a difference file including a difference between the nominal value and an actual value, which corresponds to the nominal value and occurs in the film forming apparatus, for each of the plurality of droplets;

generating a corrected drop setting file based on the drop setting file and the difference file;

simulating a behavior of the curable composition in the film forming apparatus using, as input information, the corrected drop setting file; and causing the film forming apparatus to form the actual film of the curable composition on the first member according to a result of the simulating the behavior of the curable composition in the film forming apparatus using, as the input information, the corrected drop setting file.

2. The method according to claim 1, wherein the nominal value and the actual value include information indicating a position representing a position of each of the plurality of droplets of the curable composition arranged on the first member.

3. The method according to claim 2, wherein the nominal value and the actual value include information indicating a volume representing a volume of each of the plurality of droplets of the curable composition arranged on the first member.

4. The method according to claim 2, further comprising displaying an image,
wherein the displaying includes displaying the difference.

5. The method according to claim 4, wherein the displaying the difference includes displaying a map image obtained by mapping difference information indicating the difference on a member image indicating the first member.

6. The method according to claim 5, wherein the displaying further includes displaying the result of the simulating the behavior of the curable composition in the film forming apparatus.

7. The method according to claim 6, wherein the displaying the result includes displaying, together with the difference information, information indicating a position of an unfilled region, which is not filled with the curable composition, in the space between the first member and the second member.

8. The method according to claim 7, wherein in the displaying the information, the map image on which the unfilled region is mapped is displayed.

9. The method according to claim 2, further comprising causing a user to edit the position of the curable composition to be arranged on the first member.

10. The method according to claim 9 further comprising re-simulating the behavior in accordance with the position edited in the causing the user.

11. The method according to claim 1, wherein the obtaining includes obtaining the difference file from information provided from the film forming apparatus.

12. The method according to claim 11, wherein
the film forming apparatus includes at least one sensor of an image sensor, a distance sensor, a pressure sensor, and a force sensor, and
the information provided from the film forming apparatus is obtained using the at least one sensor.

13. The method according to claim 1, wherein in the obtaining, the actual value is obtained from a test result of a part mounted on the film forming apparatus.

14. The method according to claim 1, further comprising obtaining a second difference between a second nominal value indicating unevenness of a surface of the first member, and a second actual value corresponding to the second nominal value in the film forming apparatus,
wherein in the simulating the behavior, the second difference is further used.

15. The method according to claim 1, wherein
the second member includes a first surface including a portion contacting the curable composition and a second surface on an opposite side of the first surface, and
wherein the method further comprises obtaining a second difference between a second nominal value indicating a pressure applied to the second surface, and a second actual value corresponding to the second nominal value in the film forming apparatus, and
wherein in the simulating the behavior, the second difference is further used.

16. The method according to claim 1, further comprising obtaining a second difference between a second nominal value indicating a physical property value of the curable composition, and a second actual value corresponding to the second nominal value in the film forming apparatus,
wherein in the simulating the behavior, the second difference is further used.

17. A non-transitory computer readable medium storing a program for causing a computer to execute the method of forming the actual film of the curable composition in the film forming apparatus as defined in claim 1.

18. The method according to claim 1, wherein the drop setting file is generated in common for a plurality of film forming apparatuses including the film forming apparatus for which the behavior is simulated using the corrected drop setting file.

19. The method according to claim 18, further comprising:
obtaining a second difference file including a difference between the nominal value and an actual value corresponding to the nominal value in a second film forming apparatus for each of a second plurality of droplets;
generating a second corrected drop setting file for the second film forming apparatus based on the drop setting file and the second difference file; and
simulating the behavior of the curable composition in the second film forming apparatus using, as input information, the second corrected drop setting file.

20. A film forming apparatus for forming an actual film of a curable composition by bringing the curable composition arranged on a first member and a second member into contact with each other to form the actual film film of the curable composition on the first member, the apparatus comprising:
an optimizer configured to generate a drop setting file by performing an optimization process so as to fill a space between the first member and the second member with the curable composition without any gap, wherein in the drop setting file, a state of each of a plurality of droplets of the curable composition is defined as a nominal value;
a generator configured to generate a difference file including a difference between the nominal value and an actual value corresponding to the nominal value in the film forming apparatus for each of the plurality of droplets;

a corrector configured to generate a corrected drop setting file based on the drop setting file and the difference file; and a simulator configured to simulate a behavior of the curable composition in the film forming apparatus using, as input information, the corrected drop setting file, wherein the film forming apparatus is configured to form the actual film of the curable composition on the first member according to a result of the simulating the behavior of the curable composition in the film forming apparatus using, as the input information, the corrected drop setting file.

* * * * *